United States Patent [19]
Mizuno

[11] Patent Number: 5,577,166
[45] Date of Patent: Nov. 19, 1996

[54] METHOD AND APPARATUS FOR CLASSIFYING PATTERNS BY USE OF NEURAL NETWORK

[75] Inventor: Hirotaka Mizuno, Ikeda, Japan

[73] Assignee: Hitachi, Ltd., Tokyo, Japan

[21] Appl. No.: 916,541

[22] Filed: Jul. 20, 1992

[30] Foreign Application Priority Data

Jul. 25, 1991 [JP] Japan .................................. 3-186089

[51] Int. Cl.$^6$ ................................................ G06F 15/18
[52] U.S. Cl. ............................... 395/22; 395/23; 395/24; 382/159
[58] Field of Search .................................. 395/25, 22, 21, 395/23, 24; 364/401, 402; 382/14–36

[56] References Cited

U.S. PATENT DOCUMENTS

| | | | |
|---|---|---|---|
| 4,805,225 | 2/1989 | Clark | 382/15 |
| 4,912,653 | 3/1990 | Wood | 395/23 |
| 4,914,708 | 4/1990 | Carpenter et al. | 382/14 |
| 4,941,122 | 7/1990 | Weideman | 400/285.3 |
| 4,979,124 | 12/1990 | Sachse et al. | 364/507 |
| 5,003,490 | 3/1991 | Castelaz et al. | 364/513 |
| 5,041,976 | 8/1991 | Marko et al. | 364/424.02 |
| 5,140,523 | 8/1992 | Frankel et al. | 364/420 |
| 5,282,261 | 1/1994 | Skeirik | 395/22 |

OTHER PUBLICATIONS

Robust Control of NonLinear System Using pattern recognition Dejan J. Sabajic 1989 Dec. 31, IEEE/1989.
A Neural Piecewige Linear Classifier for Pattern Classification Zhen–Ping Lo, B. Bavarian 8–14 Jul. 1991 IEEE.
Fast Trainable Pattern Classification by a modification of Kanerra's SDM Model Alvin J. Swikan 18–22 Jun. 1989 IEEE.
A Connectionist Case–based Diagnostic Expert System that Learns Incrementally Zim et al. IEEE 18–21 Nov. 1991 pp. 1693–1698.
Stock Market Prediction System with Modular NN Kimoto et al, IEEE 17–21 Jun. 90 pp. I–1 to I–6.
H. Asoh, "Neural Network Information Processing", Sangyo Tosho Co., Ltd. 1988, p. 39.

*Primary Examiner*—David D. Knepper
*Assistant Examiner*—Richemond Dorvil
*Attorney, Agent, or Firm*—Fay, Sharpe, Beall, Fagan, Minnich & McKee

[57] ABSTRACT

A method of and an apparatus for classifying an input pattern as a classification object by use of a neural network and transforming the input pattern into an output pattern as a result of classification, wherein there is obtained from the neural network having received an input pattern an output pattern for the input pattern such that the obtained output pattern is compared with a correct output pattern thereafter attained for the input pattern, a result of the comparison is sequentially stored in a memory, and the stored result of comparison is monitored to thereby detect an abnormality thereof.

14 Claims, 10 Drawing Sheets

FIG. 5

| NO. | INPUT PATTERN | CORRECT OUTPUT PATTERN | OUTPUT PATTERN FOR NEURAL NETWORK |
|---|---|---|---|
| 1 | | | |
| 2 | | | |
| ⋮ | ⋮ | ⋮ | ⋮ |
| NL | | | |

| | |
|---|---|
| AVERAGE OF INPUT PATTERNS | |
| STANDARD DEVIATION OF INPUT PATTERNS | |
| MINIMUM VALUE OF INPUT PATTERNS | |
| MAXIMUM VALUE OF INPUT PATTERNS | |

FIG. 9

| NO. | INPUT PATTERN | OUTPUT PATTERN FROM NEURAL NETWORK | CORRECT OUTPUT PATTERN | ERROR BETWEEN OUTPUT PATTERNS |
|---|---|---|---|---|
| | 91 | 92 | 93 | 94 |
| 1 | | | | |
| 2 | | | | |
| ⋮ | ⋮ | ⋮ | ⋮ | ⋮ |
| NH | | | | |

| | |
|---|---|
| 95 — ACCUMULATED ERROR | |
| 96 — AVERAGE ERROR | |

17

METHOD AND APPARATUS FOR CLASSIFYING PATTERNS BY USE OF NEURAL NETWORK

BACKGROUND OF THE INVENTION

1. Field of the Invention

The present invention relates to a method of and an apparatus for classifying patterns by use of a neural network. The present invention particularly relates to a method of and an apparatus for classifying patterns by use of a neural network applicable to a case where input patterns to be classified are possibly different from input patterns included in learning or training data or to a case where a structure of a problem is changed after a training or learning of a neural network and hence a pair of an input pattern to be classified and a correct output pattern associated with the input pattern may be in conflict with the contents of training or learning data for achieving corrections on the training data to conduct an appropriate classification of the patterns.

2. Description of the Prior Art

A conventional method of accomplishing a pattern classification for classifying input patterns into predetermined categories by use of a neural network has been described on page 39 of "Neural Network Information Processing" written by Hideki Asoh and published by the Sangyo Tosho Co., Ltd. in 1988. According to the description, information processing in a hierarchically layered network is a discrimination or transformation of patterns and a training or learning of a network means that, in response to a presented example of transformation, the network favorably imitates or simulates the transformation in an appropriate manner.

FIG. 1 schematically shows the principle of a neural network 11 in the prior art.

The neural network 11 is a computation model having a network form in which nodes 41, simulating nerve cells or neurons, are arranged in a hierarchy to be linked with each other by arcs 42. In this configuration, the arcs 42 are assigned weights to adjust the output power of each signal transmitted between the nodes 41. Moreover, each node 41 has a threshold value such that when a total of the input power received from the nodes 41 in a hierarchic layer preceding the layer of the pertinent node 41 is over the threshold, a signal is transmitted to the nodes 41 in the subsequent layer. Input pattern items of an input pattern 18 are supplied as state values of the respective nodes 41 in the first layer. According to the state values, it is possible to obtain the state values of the nodes in the second layer, in the third layer, and so on, thereby attaining output pattern items of an output pattern 19 as the state values of the final (output) layer of the network.

In FIG. 1, when the input pattern 18 includes m items or elements $X_i$ (i=1, 2, ..., m), the input pattern 18 can be represented as a vector X.

$$X=(X_1, X_2, \ldots, X_m) \quad (1)$$

Assume the input pattern 18 to be classified into any one of n categories. The output pattern 19, as the result of classification, is then expressed as a vector Y including n elements $Y_i$ (i=1, 2, ..., n).

$$Y=(Y_1, Y_2, \ldots, Y_n) \quad (2)$$

In this regard, when the input pattern 18 belongs to an i-th category, $Y_i=1$ results; otherwise, $Y_i=0$ results.

In the training of the neural network 11, the input pattern, namely, the vector X is supplied to the neural network 11 so as to cause the neural network 11 to compute the output pattern, namely, the vector Y. In this situation, a teacher pattern (correct output pattern) T is instructed as a desirable output pattern for the input pattern. Like the vector Y, the pattern T also includes n elements $T_1$ to $T_n$. In response to the instructed pattern T, the neural network 11 corrects weights of the respective arcs to minimize the difference between the current output pattern Y and the desired output pattern T. The process including the indication of the transformation and the correction of weights is repeatedly achieved as above for all pairs of input patterns X and teacher patterns (correct output patterns) T. As a result, the neural network 11 simulates a favorable transformation from the input pattern X into the output pattern Y.

SUMMARY OF THE INVENTION

According to the prior art, there has been established a premise that the neural network conducts the learning with the learning data related to the overall range of input patterns. However, if it is not guaranteed that the learning has been accomplished with the learning data related to the overall range of input patterns, the results of classification of the input patterns will be unpredictable, which has not been described in the literature above.

In other words, for example, when the input patterns including data obtained in a time series are to be classified, only the past data beforehand collected can be utilized as the learning data. In this situation, there may occur a case where an input pattern produced from data appearing thereafter is different from any input patterns thus collected. Also in a case where the neural network is supplied with an input pattern which has not yet appeared, the neural network outputs an output pattern as a result of classification. In the literature above, the method of interpreting the output pattern attained in such a case has not been described.

It is therefore an object of the present invention to provide a method of and an apparatus for classifying patterns which solve the problem of the prior art.

Another object of the present invention is to provide a method of and an apparatus for classifying patterns by use of a neural network which, even when an input pattern is deviated from the distribution of input patterns of learning data, detects deterioration in a rate of correct solution and decides reliability of an output pattern related to the input pattern by a determination of the distribution.

According to an aspect of the present invention, a pattern classification method of classifying an input pattern as a classification object by use of a neural network and transforming the input pattern into an output pattern as a result of classification includes steps of obtaining through the neural network having received an input pattern an output pattern for the input pattern, comparing the obtained output pattern with a correct output pattern thereafter attained for the input pattern, sequentially storing a result of the comparison in a memory, and monitoring the stored results of the comparison to thereby detect an abnormality thereof.

According to another aspect of the present invention, a pattern classification method of classifying an input pattern as a classification object by use of a neural network and transforming the input pattern into an output pattern as a result of classification includes steps of comparing an input pattern supplied to the neural network with each input patterns of all training data to be employed in a training of the neural network, obtaining a position of the supplied input pattern in a distribution of the input patterns of the training data, and retrieving training data similar to the supplied input pattern from the training data.

According to still another aspect of the present invention, a pattern classification method of classifying an input pattern as a classification object by use of a neural network and transforming the input pattern into an output pattern as a result of classification includes steps of obtaining through the neural network having received an input pattern an output pattern for the input pattern, comparing the obtained output pattern with a correct output pattern thereafter attained for the input pattern, sequentially storing a result of the comparison in a memory, monitoring the stored results of the comparison and thereby detecting an abnormality thereof, and notifying, in response to a detection of the abnormality, necessity of a re-training of the neural network.

According to further another aspect of the present invention, a pattern classification method of classifying an input pattern as a classification object by use of a neural network and transforming the input pattern into an output pattern as a result of classification includes steps of obtaining, according to time series data, an input pattern to be supplied to the neural network and a correct output pattern to be obtained thereafter for the input pattern, obtaining through the neural network having received the obtained input pattern an output pattern for the input pattern, comparing the obtained output pattern with the correct output pattern thereafter attained for the input pattern, sequentially storing a result of the comparison in a memory, and monitoring the stored results of comparison and thereby detecting an abnormality thereof.

According to a mode of embodying the present invention, an output pattern produced from the neural network in response to an input pattern supplied thereto is compared with an output pattern of a correct output pattern to be subsequently outputted for the input pattern to sequentially accumulate a result of the comparison as an execution history so as to continuously monitor the accumulated results, thereby detecting any abnormality in the results. In an alternative mode of embodying the present invention, there are disposed an input pattern monitoring module for comparing an input pattern supplied to the neural network with input patterns of training or learning data to be used in a training or learning of the neural network, a training data file for storing therein the training data, an execution history monitoring module for comparing an output pattern generated from the neural network for the supplied input pattern with a correct output pattern to be obtained thereafter for the input pattern, accumulating a result of the comparison as a history of execution, and judging to determine an abnormality according to the accumulated results, an execution history file for storing therein the history of results of comparison, and a training data updating module for reading the contents respectively from the execution history file and the training data file, generating new training data, and updating the contents of the files therewith. In addition, the input pattern monitoring module may obtain a position of the input pattern supplied as a classification object in the distribution of input patterns of the overall training data to retrieve training data having an input pattern analogous to the input pattern to be classified. Moreover, the execution history monitoring module may accumulate as an execution history in the execution history file the input pattern supplied as a classification object, the output pattern produced from the neural network in response to the input pattern, and the correct output pattern for the input pattern. Furthermore, it may also be favorable that the execution history monitoring module attains for each execution history the error or difference between the output pattern produced from the neural network for the input pattern and the correct output pattern therefor, computes an average error of the obtained errors, keeps the result of computation in the execution history file, and notifies the necessity of re-training or re-learning of the neural network when the average or mean error exceeds a predetermined threshold value. In addition, in the re-training of the neural network, the execution history obtained after the preceding training may be added to the training data used in the preceding training to produce new training data so as to delete from the previous training data any data which is in conflict with the data in the execution history, thereby preparing new training data for the re-training.

According to the present invention, the input pattern monitoring module compares an input pattern with the input patterns of the respective training data as well as with the distribution of the input patterns of the training data. That is, there is attained a position of the supplied input pattern in the distribution of the input patterns of the training data and there is retrieved training data having an input pattern similar to the received input pattern. When the input pattern is not analogous to any input pattern of the training data, the input pattern monitoring module can detect the fact to notify the user of the deteriorated reliability of the classification result for the supplied input pattern.

Moreover, the execution history monitoring module compares the output pattern with the correct output pattern attained later for the input pattern, accumulates the result as a history of execution, and monitors the accumulated results of execution, thereby notifying the user of the necessity of the re-training of the neural network when the ratio of correct output or answer is decreased. Namely, when a correct output pattern is obtained for the supplied input pattern, the output pattern created by the neural network for the input pattern is compared with the correct output pattern so as to store a result of the comparison as a history of execution. Next, based on the accumulated history of execution is detected an increase in the average error (frequency of error in classification) between the output pattern from the neural network and the correct output pattern, thereby reporting the condition to the user. The user accordingly recognizes a problem of the current neural network to add the data of history of execution accumulated up to this point to the training data so as to re-execute the training of the neural network.

BRIEF DESCRIPTION OF THE DRAWINGS

These and other objects and advantages of the present invention will become apparent by reference to the following description and accompanying drawings wherein:

FIG. 5 is a diagram showing an example of the internal data layout of a training data file in the configuration of FIG. 3;

FIG. 9 is a diagram showing an example of the internal data layout of the execution history file of FIG. 3;

DESCRIPTION OF THE PREFERRED EMBODIMENTS

Referring now to the accompanying drawings, description will be given in detail of embodiments according to the present invention.

Figure 2:
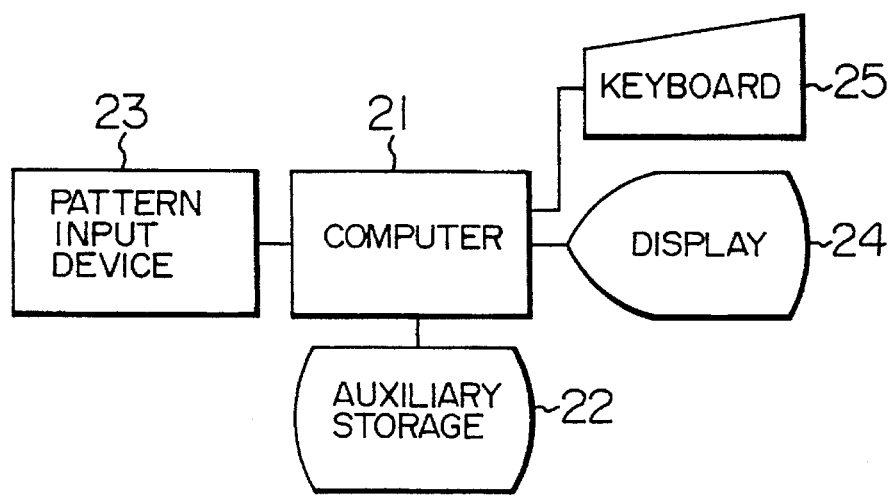
FIG. 2 is a block diagram showing the configuration of an apparatus for classifying patterns in an embodiment according to the present invention.

FIG. 2 shows the constitution of a pattern classifying apparatus in an embodiment according to the present invention.

Figure 3:
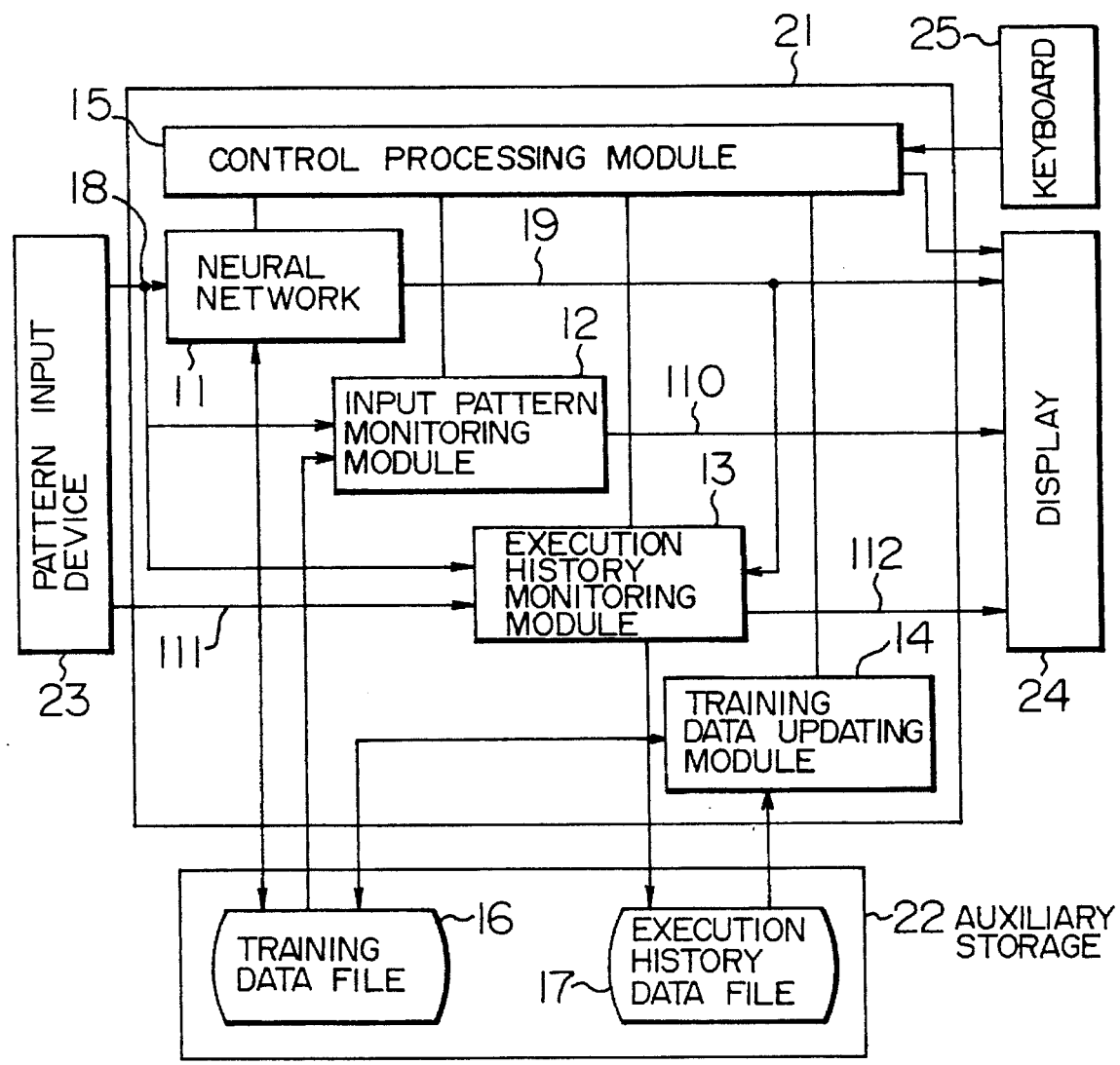
FIG. 3 is a functional block diagram showing the constitution of the embodiment of FIG. 2.

The apparatus of this embodiment includes a computer 21 for classifying patterns by use of a neural network, a memory, e.g., an auxiliary storage 22 for storing therein learning or training data for a training of the neural network and a history of results from execution of pattern classification, a pattern input device 23 for receiving from an external device an input pattern to be classified, an output device 24 for outputting therefrom the result of pattern classification, e.g., a display 24 for displaying thereon the classification result, and an input device, e.g., a keyboard 25 for receiving an instruction from a user or an operator. FIG. 3 is a functional block diagram showing in detail the functional module configuration of the computer 21 executing the pattern classification in the pattern classifying apparatus according to the present invention.

As shown in FIG. 3, in the computer 21, there are integrally disposed program modules including a neural network 11, an input pattern monitoring module 12, an execution history monitoring module 13, a training data updating module 14, and a control processing module 15 for controlling initiation of these sections. Moreover, a training data file 16 and an execution history file 17 are loaded in the auxiliary storage 22. As the neural network 11, a neural network chip may be disposed in place of the program module.

In execution of classification, the neural network 11 converts an input pattern 18 externally supplied via the pattern input device 23 into an output pattern 19 as a result of classification. Furthermore, in execution of training or learning, the neural network 11 reads training data from the training data file 16 to modify parameters in the neural network 11, thereby simulating the transformation from the input pattern of training data into the output pattern.

Subsequently, the input pattern monitoring module 12 reads the input pattern and the training data respectively from the pattern input device 23 and the training data file 16 to produce a monitored result 110 of input pattern.

In addition, the execution history monitoring module 13 receives the input pattern 18 and a correct output pattern 111 from the pattern input device 23 and an output pattern from the neural network 11 to additionally record the data items in the execution history file 17. Moreover, the execution history monitoring module 13 outputs a monitored result 112 based on the average error kept therein.

The training data updating module 14 reads, in response to an instruction for re-training, data respectively from the execution history file 17 and the training data file 16 to create new training data, thereby adding the data in the training data file 16.

Figure 4:
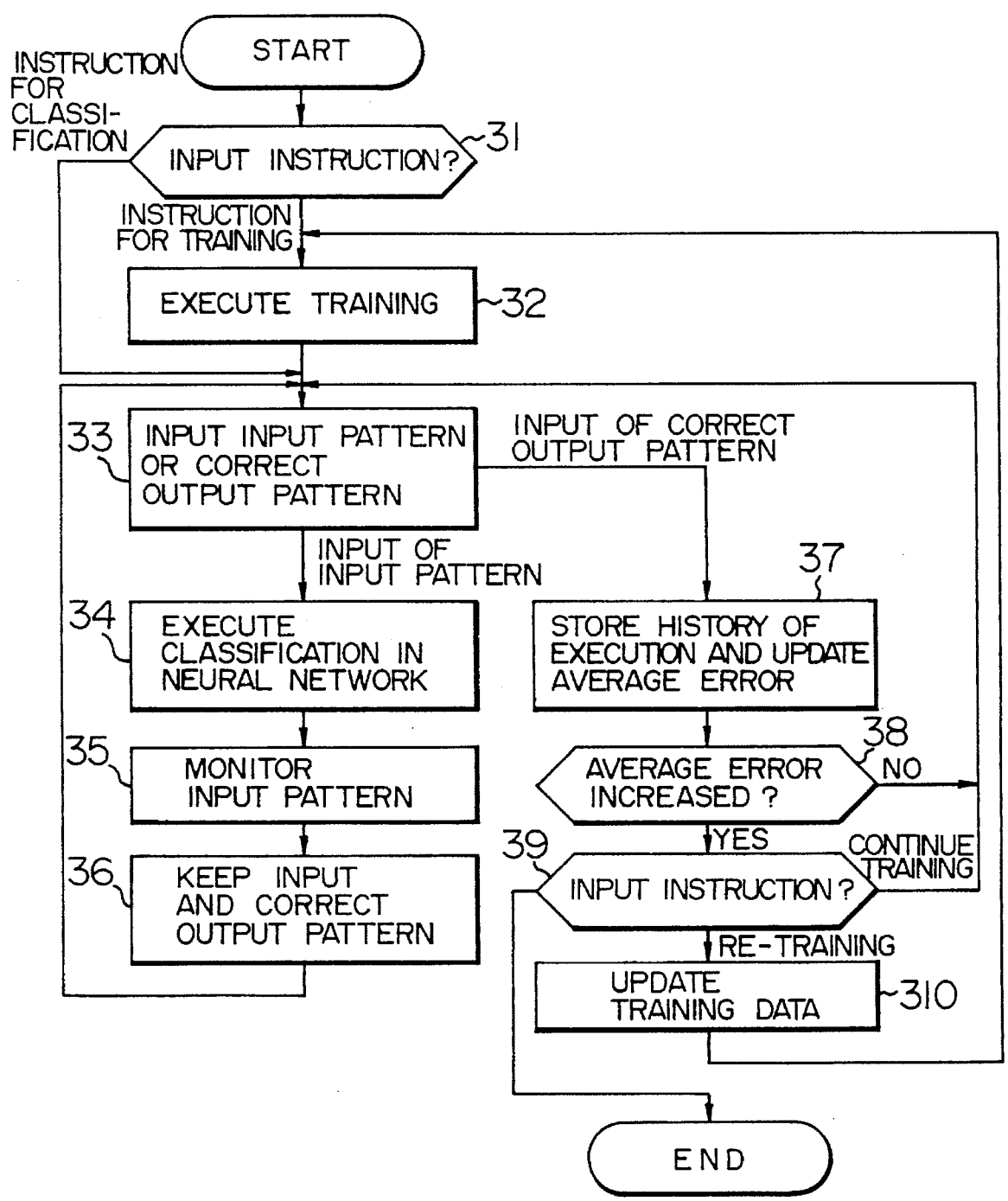
FIG. 4 is a flowchart for explaining an example of operation achieved by the embodiment of FIG. 2.

FIG. 4 is a flowchart showing an example of processing achieved by the pattern classifying apparatus in the embodiment.

First, the control processing module 15 displays a guidance image on a screen of the display 24 to request the user to input an instruction for execution of training or classification. The control module 15 in the computer 21 receives via the keyboard 25 an instruction inputted from the user in response to the request (step 31).

When an execution of training is instructed, the control module 15 activates the neural network 11, thereby instructing an execution of training. As a result, the activated neural network 11 reads training data from the training data file 16 to execute the training according to the obtained training data (step 32).

When an execution of classification is instructed from the user, the control processing module 15 activates the neural network 11 to thereby instruct an execution of classification and then initiates the input pattern monitoring module 12 and the execution history monitoring module 13. When an input pattern 18 is externally inputted via the pattern input device 23, the neural network 11 transforms the input pattern 18 into an output pattern 19 as a result of classification to send the pattern 19 to the display 24 and the execution monitoring module 13 (steps 33 and 34). Subsequently, the input pattern monitoring module 12 receives the input pattern 18 and the training data attained from the training data file 16 to generate a monitored result 110 for the input pattern, thereby transmitting the result 110 to the display 24 (step 35). Moreover, the execution history monitoring module 13 receives the input pattern 18 and the output pattern 19 from the neural network 11 to keep the values therein (step 36). Control is thereafter returned to the step 33.

When the correct output pattern 111 is supplied via the pattern input device 23 (step 33), the execution history monitoring module 13 stores, in the execution history file 17, the input and output patterns beforehand kept therein and the received correct output pattern. Furthermore, the average error, which has been kept retained from the classification start point up to the current point, is updated (step 37). When the average error exceeds a preset constant (step 38), the monitored result 112 of execution history is presented on the screen of the display 24 to notify the increase in the average error to the user. The control processing module 15 requests the user to input an instruction so as to determine whether or not a re-training of the neural network 11 is to be executed. This may possibly be achieved, for example, by displaying a request message on the display 24. An instruction supplied in response thereto is received via the keyboard 25 (step 39).

When the instruction from the user indicates the re-training, the control module 15 invokes the training data updating module 14. The module 14 then reads data respectively from the execution history file 17 and the training data file 16 to produce new training data, thereby recording the new data in the training data file 16 and deleting the contents of the execution history file 17 (step 310).

Returning to the step 32, the control processing module 15 invokes the neural network 11 for an execution of training.

FIG. 5 shows an example of the internal data layout of the training data file of FIG. 3.

In the training data file 16, there are stored a plurality of pairs of data. Each data in the pair includes an input pattern 51, a teacher pattern (correct output pattern) 52, and an output pattern 53 produced for the input pattern 51 by the neural network 11 after the training. Moreover, also stored in the file 16 are quantities representing the distribution of the input patterns 51 of the training data. Namely, there are stored an average 54, a standard deviation 55, a minimum value 56, and a maximum value 57 attained for the input patterns 51 of the training data.

Assume now that the number of training data stored in the training data file 16 is NL and the input pattern 51 of the j-th training data is expressed as follows.

$$XL(j)=(XL(j)1, XL(j)2, \ldots, XL(j)m) \quad (3)$$

where, $j=1, \ldots, NL$.

In this case, the average 54 and the standard deviation are represented as follows.

$$M=(M1, M2, \ldots, Mm) \quad (4)$$

$$S=(S1, S2, \ldots, Sm) \quad (5)$$

where, Mi and Si are expressed by the following expressions.

$$Mi = \frac{1}{NL} \sum_{j=1}^{NL} XL(j)i$$

$$Si = \sqrt{\frac{1}{NL} \sum_{j=1}^{NL} (XL(j)i - Mi)^2}$$

The minimum and maximum values are represented as follows.

$$A=(A1, A2, \ldots, Am) \quad (6)$$

$$B=(B1, B2, \ldots, Bm) \quad (7)$$

where, Ai and Bi $(i=1, 2, \ldots, m)$ are respectively obtained from the following expressions.

$$Ai = \min_{j} XL(j)i \quad (8)$$

$$Bi = \max_{j} XL(j)i \quad (9)$$

where, $$\min_{j} \text{ and } \max_{j}$$

are the minimum and maximum values respectively of $XL(j)$ for the variable j.

Figure 6:
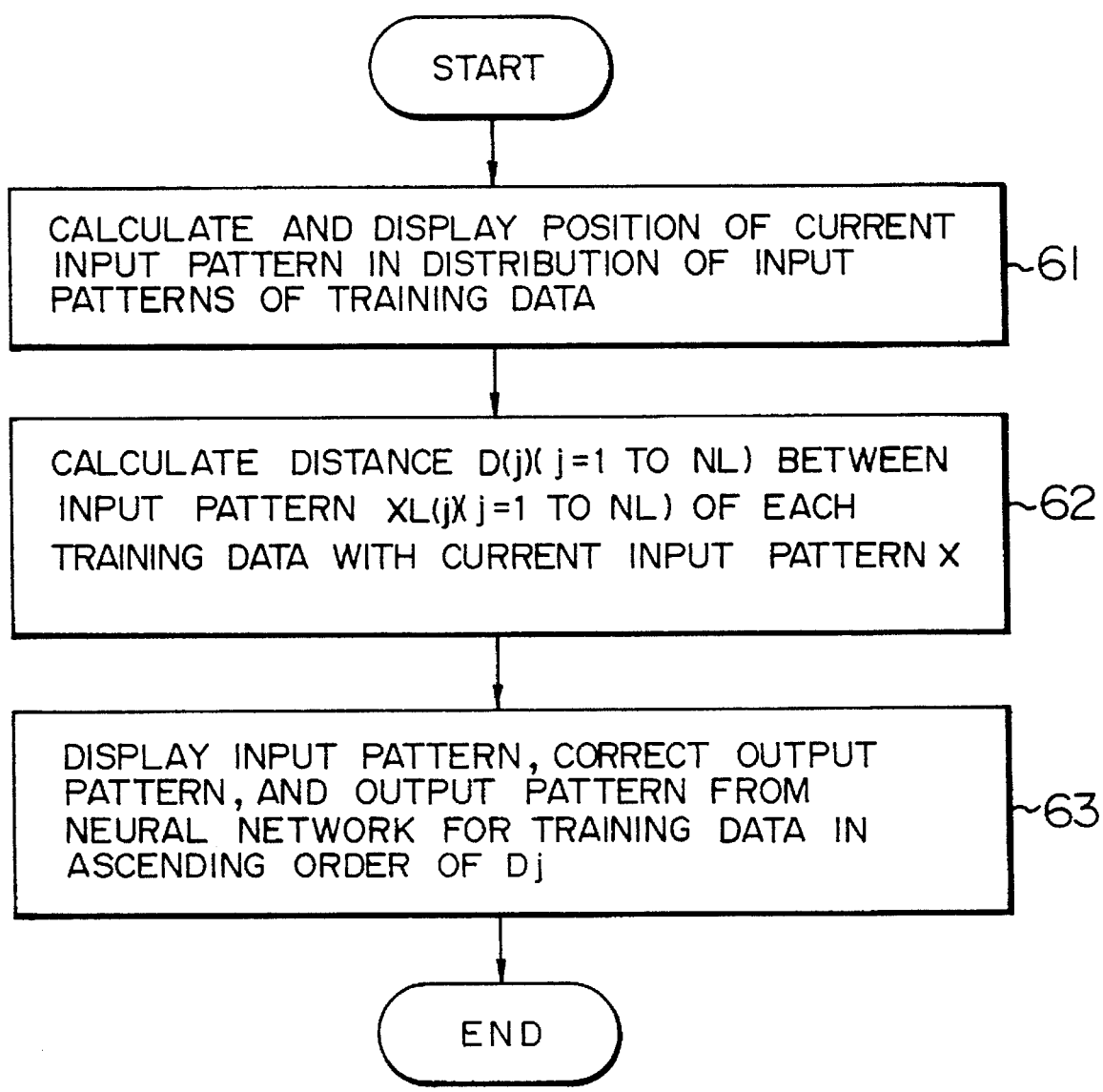
FIG. 6 is a flowchart showing the operation of a module for monitoring input patterns of FIG. 3.

FIG. 6 is a flowchart showing an example of the operation achieved by the input pattern monitoring module in the embodiment according to the present invention.

In this processing flow, there is first computed a position P of the current input pattern 18 in the distribution of the input patterns 51 of the training data file 16.

Assume the input pattern 18 to be $$X=(X1, X2, \ldots, Xm) \quad (10).$$

The position P is then expressed as $$P=(P1, P2, \ldots, Pm) \quad (11).$$

In this expression, Pi $(i=1, 2, \ldots, m)$ is as follows.

$$Pi=(Xi-Mi)/Si \quad (12)$$

In other words, Pi is attained by normalizing the deviation of Xi from the average Mi based on the standard deviation Si.

Namely, the user can identify the position of the input pattern X in the distribution. It can be seen from the expression (12) that when the absolute value of Pi becomes to be large, the i-th element of the input pattern 18 is arranged at a peripheral position in the distribution associated with a rare frequency of appearance, i.e., near the end of distribution.

Subsequently, a search is made through the training data to detect an input pattern 51 most similar to the current input pattern 18. Assume now that the number of training data is NL, the input pattern for the i-th training data is $XL(j)$, the correct output pattern is $TL(j)$, and the output pattern from the neural network after the training of the neural network 11 on the input pattern $XL(j)$ is $YL(j)$.

$$XL(j)=(XL(j)1, XL(j)2, \ldots, XL(j)m) \quad (13)$$

$$TL(j)=(TL(j)1, TL(j)2, \ldots, TL(j)m) \quad (14)$$

$$YL(j)=(YL(j)1, YL(j)2, \ldots, YL(j)m) \quad (15)$$

where, $j=1, \ldots, NL$.

A distance $D(j)$ between the current input pattern and the input pattern $XL(j)$ of training data is calculated for each of $j=1, \ldots, NL$ as follows (step 62).

$$D(j) = \sqrt{D(j)1^2 + D(j)2^2 + \ldots + D(j)m^2} \quad (16)$$

In the expression (16), $$D(j)i=|((X_i-XL(j)i)/Si)" \quad (17)$$

where, $i=1, \ldots, m$.

Next, the training data are arranged in the ascending order of the value of distance Dj. For the obtained jmin-th training data, the input pattern XL(jmin), the teacher pattern (correct output pattern) TL(jmin), the output pattern YL(jmin) from the neural network after the learning on the input pattern XL(jmin) are presented on the display 24 to notify the results to the user (step 63).

Figure 7:
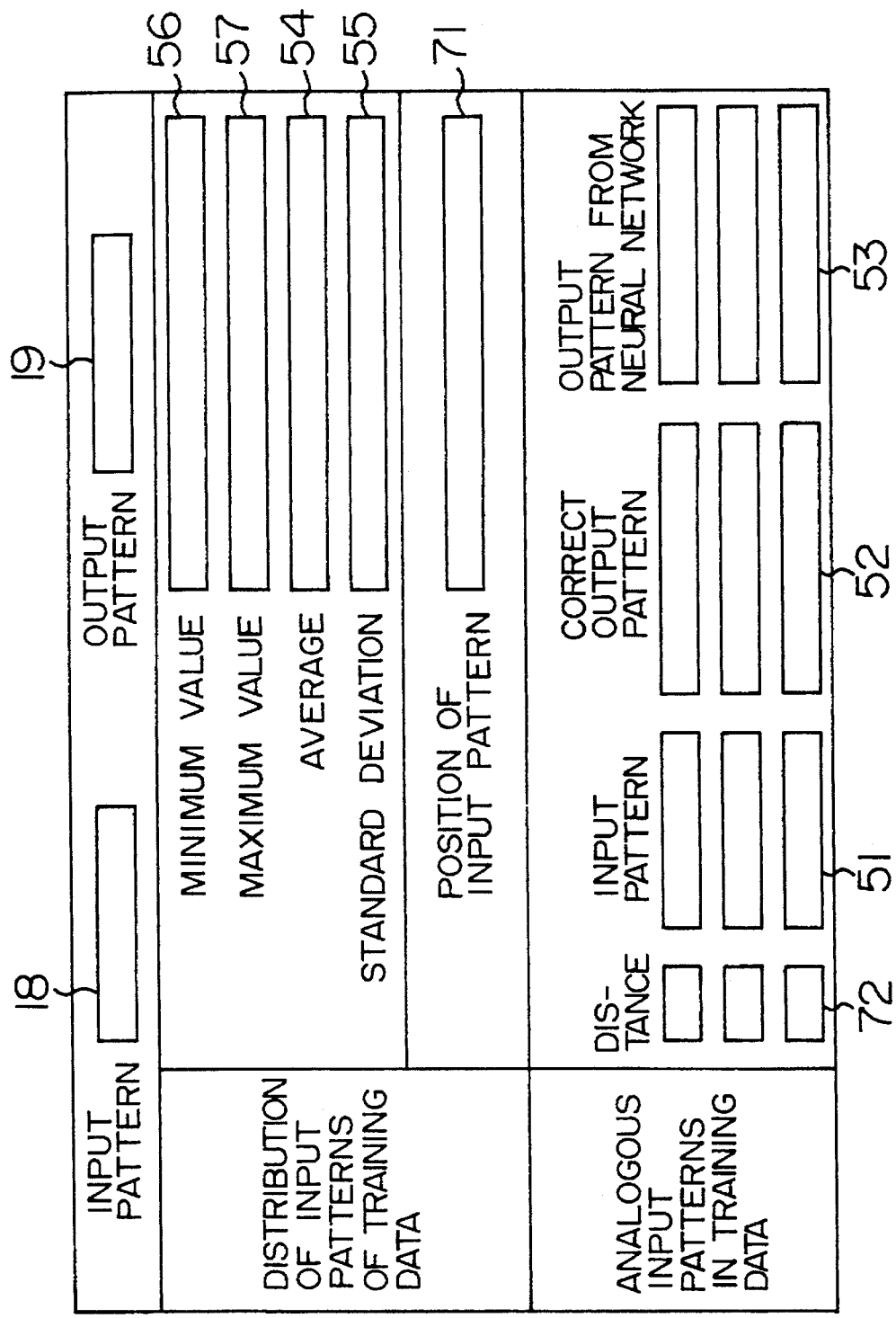
FIG. 7 is a diagram showing a display example of results attained by monitoring input patterns.

FIG. 7 shows an example of screen image of the display presenting the output results respectively from the neural network and the input pattern monitoring module.

In this image, there are displayed in an upper portion thereof the supplied input pattern X18 and the output pattern Y19 generated from the neural network as a classification result for the input pattern X18.

Moreover, in a central portion of the screen, there is displayed the distribution of the input patterns stored as training data in the training data file 16. More specifically, from the top to the bottom, there are sequentially arranged the minimum value A56, the maximum value B57, the mean value M54, and the standard deviation S55 of the distribution, which are followed by the position P71 of the input pattern 18 in the distribution.

In addition, displayed in a lower portion of the screen are retrieved results of input patterns which are attained from the training data of the training data file 16 and which are analogous to the input pattern X18.

In the screen, there are displayed in a sequence of, for example, the distance of input pattern 72, the input pattern XL(jmin) 51, the teacher pattern (correct output pattern) TL(jmin) 52, and the output pattern YL(jmin) 53 generated from the neural network 11 after the training.

Figure 8:
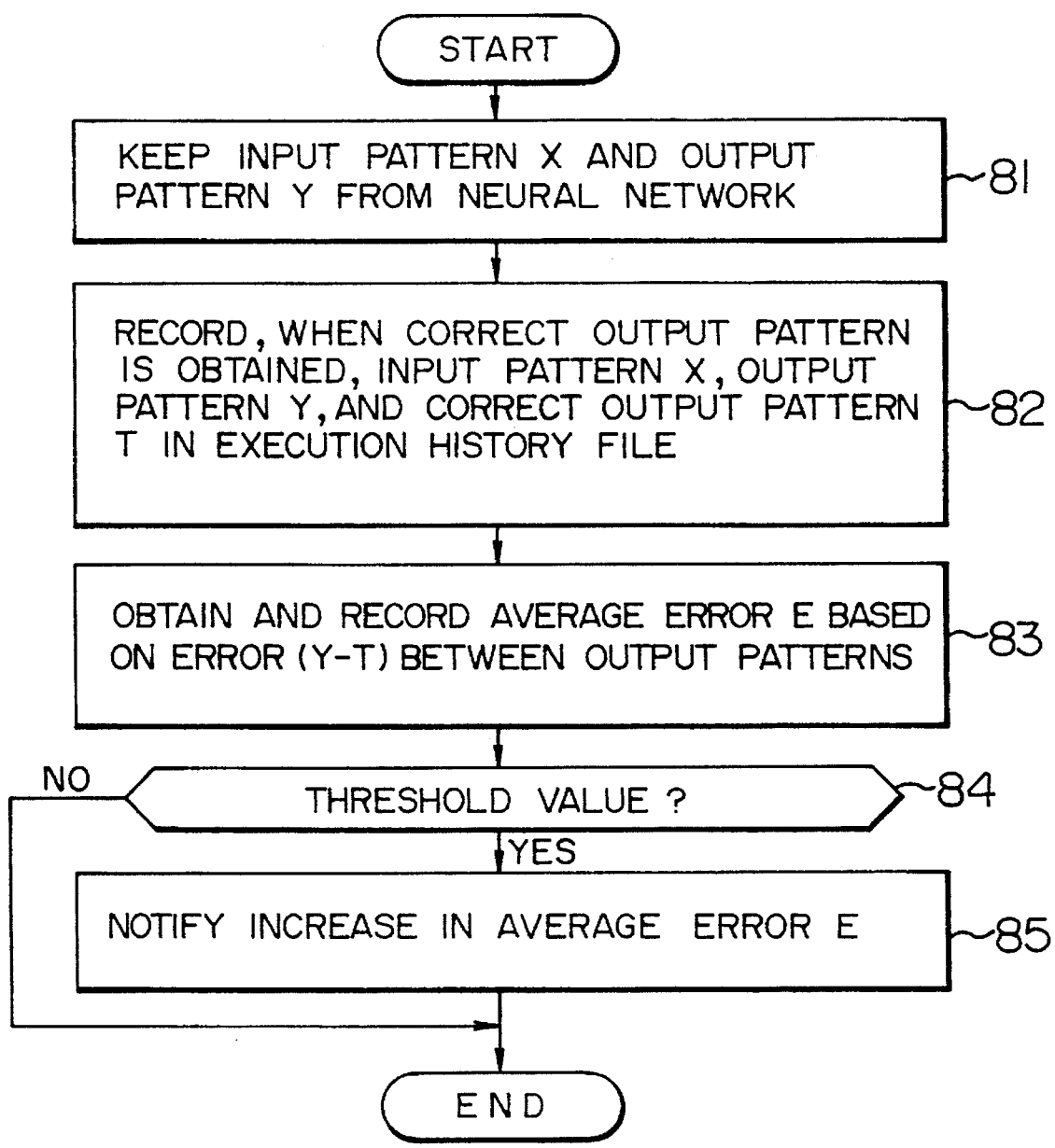
FIG. 8 is a flowchart showing an example of operation conducted by a processing module for monitoring a history of execution of FIG. 3.

FIG. 8 is a flowchart showing an example of the operation conducted by the execution history monitoring module according to the present invention.

First, an input pattern X and an output pattern Y are attained to be kept as time series data in a storage (step 81). When a correct output pattern T is obtained, the input pattern X related thereto, the output pattern Y created from the neural network 11 for the input pattern X, and the correct output pattern T are recorded as time series data in the execution history file 17 (step 82). Next, the error (Y−T) between the output pattern Y and the correct output pattern T is computed for each output pattern Y to attain the average error E so as to record the average error E in the file 17 (step 83). When the average error E exceeds the threshold value (step 84), the increase in the average error E is notified to the user (step 85). In response thereto, the user executes a re-training of the network 11. The monitoring operation of the average output error E and the notification thereof will be next described in more detail by reference to FIG. 9.

FIG. 9 shows an example of the internal data layout of the execution history file 17 according to the present invention.

The file 17 contains in a time series records each including an input pattern XH 91, an output pattern YH 92 from the neural network 11 for the input pattern XH 91, a correct output pattern TH 93 to be attained later, and an error between output patterns 94. Moreover, there are recorded an accumulated output error 95 and an average error 96. Assuming that the average output error 96 is E and the number of history data accumulated in the file 17 in a range from the classification start point to the current point is represented by NH, the value of E is computed as follows.

$$E = \frac{1}{NH} \left\{ \sum_{j=1}^{NH} \sum_{i=1}^{n} (YH(j)i - TH(j)i)^2 \right\}$$

The execution history monitoring module 13 monitors the average output error E kept therein to notify, when the value of E exceeds a preset threshold value, the necessity of re-training of the neural network 11 to the user, for example, by presenting a message to the display 24 (steps 84 and 85 of FIG. 8).

In the re-training or re-learning of the neural network 11, the training data employed in the previous training and the execution history (at least a pair of an input pattern and a correct output pattern) obtained after the previous training are used as the training data. First, the input pattern 91 and the correct output pattern 93 read from the execution history file 17 are additionally written respectively as an input pattern and a teacher pattern (correct output pattern) in the training data file 16. However, favorably, data items of the previous training data which are in conflict with the data of the file 17 are deleted from the training data to be added to the file 16.

When the re-training is initiated, the neural network 11 receives a pair of an input pattern 51 and a teacher pattern (correct output pattern) 52, which are read from the file 16, thereby conducting the training.

In this embodiment, the user can visually check the following items in the screen image of FIG. 7.

(a) When a large distance exists between the input pattern X and the input pattern XL(jmin) of the training data, it is designated that the input pattern X is not similar to any input patterns already used in the training. This consequently lowers the reliability of the output pattern Y as the classification result from the neural network 11 for the input pattern X.

(b) The output pattern Y can be assumed to have a high reliability when a large distance exists between the input pattern X and the input pattern XL(jmin) of the training data, the output pattern YL(jmin) after the training is equal to the teacher pattern (correct output pattern) TL(jmin), and the output pattern Y is analogous to the output pattern YL(jmin) after the training.

(c) The execution history monitoring module 13 favorably monitors in a continuous fashion the average output error E kept therein to notify, when the value E exceeds a predetermined threshold value, the increase in the average error E to the user. Consequently, the user can recognize the necessity of re-training of the neural network 11.

In this connection, the system may be so designed to automatically accomplish the re-training of the neural network 11 without outputting the notification message of the re-training to the user.

Next, description will be given of the operation in a case where the re-training is automatically initiated after the pertinent message is notified to the user.

The execution history monitoring module 13 notifies, when the average output error E exceeds the preset threshold value, the necessity of re-training of the neural network 11 to the user and then issues a request for the re-training to the control processing module 15.

On receiving the request, the control processing module 15 invokes the training data updating module 14. The module 14 reads necessary data respectively from the execution history file 17 and the training data file 16 to update training data, thereby storing the resultant data in the training data file 16.

Next, the control module 15 activates the neural network 11 for the re-training. The neural network 11 reads data from the training data file 16 to execute the training and then stores data resultant from the training in the training data file 16, thereby achieving the automatic re-training.

Subsequently, description will be given of an example capable of increasing the ratio of correct output in the neural network 11.

Assume that for the following desirable input/output relationship of the neural network 11 expressed as a problem (input/output relationship) before the training of the neural network 11, a training is appropriately conducted so that the input/output relation is reproduced by the neural network 11.

| Input pattern | | Classification result |
|---|---|---|
| ① (a,b,c,d) | → | (1,0,0) |
| ② (e,f,g,h) | → | (0,1,0) |
| ③ (i,j,k,l) | → | (0,0,1) |

Under this condition, if the property (the desirable input/output relationship) is kept unchanged, the value of average error in the history of execution is kept to be 0. Consequently, the ratio of correct output is developed as 100%.

Assume the property of the problem is changed as follows.

| Input pattern | | Classification result |
|---|---|---|
| ① (a,b,c,d) | → | (0,1,0) |
| ② (e,f,g,h) | → | (0,1,0) |
| ③ (i,j,k,l) | → | (0,0,1) |

In this case, each time the correct output pattern (0,1,0) is supplied for the input pattern ①, the value of average error is increased. Assume that the input patterns ① to ③ appear at an identical frequency, the ratio of correct output is lowered to about 66% for the neural network in this situation.

In this case, if the neural network 11 conducts a training for the new input/output relationship, the ratio of correct output is restored to 100% when the property of the problem is kept unchanged.

Figure 10:
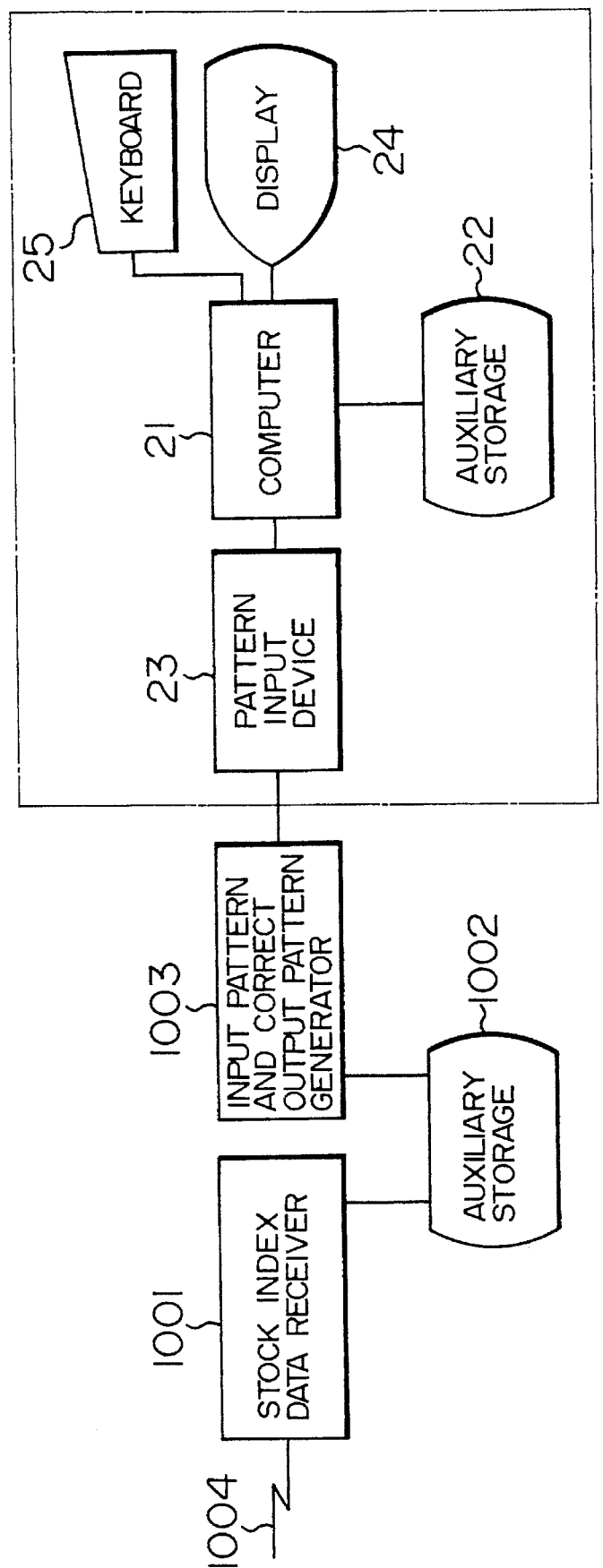
FIG. 10 is a block diagram showing the configuration of another embodiment in which a pattern classifying apparatus is applied to a system for predicting a stock index trend in accordance with the present invention.

FIG. 10 is a block diagram showing the overall configuration of an example of a system for predicting a stock index trend in a stock market implemented by adopting the pattern classifying apparatus according to the present invention. The stock index has been introduced to denote a trend of activities in the overall stock market and is calculated according to the prices of stocks of all stock names or primary stock names. Namely, the stock price related to each stock name is weighted depending on the number of stocks issued so as to calculate an average of the weighted stock prices.

In the prediction system of FIG. 10, the stock indices are used, by way of example, as inputs thereto so as to predict a trend in the future of the stock index, namely, an increase or a decrease in the stock index.

The prediction system of FIG. 10 includes stock index data receiver 1001 for receiving data 1004 of stock index daily transmitted from an external stock exchange, an auxiliary storage 1002 for storing therein the received data of daily stock index, an input and correct output pattern generator 1003 for reading time series data of stock index from the auxiliary storage 1002, for generating an input pattern and a correct output pattern as inputs to the pattern classifying apparatus according to the present invention and for supplying the generated patterns to the pattern classifying apparatus, and the constituent components (enclosed by dot-and-dash lines) of the pattern classifying apparatus according to the present invention, namely, a pattern input device 23, a computer 21, an auxiliary storage 22, a keyboard 25, and a display 24.

In operation of the configuration of FIG. 10, the receiver 1001 receives the stock index data 1004 sent, for example, daily from the the stock exchange so as to additionally record the data in the auxiliary storage 1002.

In the storage 1002, there are accumulated in a time series the data of the stock index thus daily recorded therein. Assume the data to be $a_1, a_2, a_3, \ldots, a_N$ in the sequence, where N denotes the total number of data thus accumulated, $a_N$ indicates the latest data, and $a_1$ denotes the oldest data which has been stored (N−1) days before.

Figure 11:
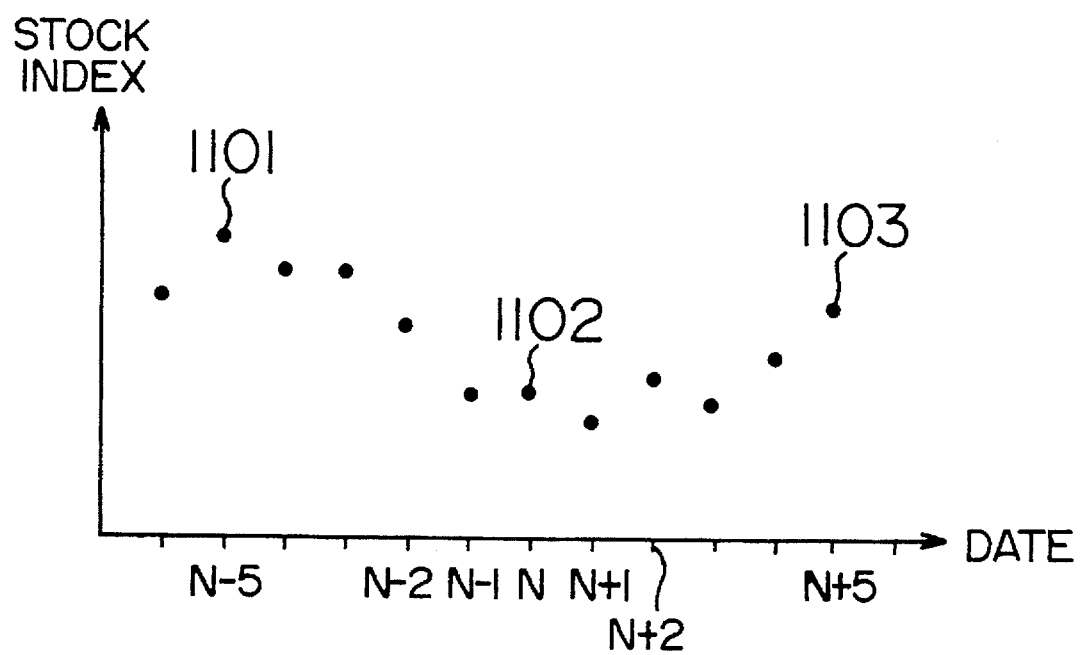
FIG. 11 is a graph showing time series data of stock index in the embodiment of FIG. 10.

FIG. 11 is a graph representing an example of the time series data ai of the stock index.

The pattern generator 1003 reads the time series data $a_i$ (i=1 to N) from the storage 1002 to produce therefrom an input pattern X 18 and a correct output pattern T 111 for the pattern classifying apparatus, which will be described in detail herebelow.

Assume that the input pattern X 18 to be supplied to the neural network in the pattern classifying apparatus includes m elements $X_i$ (i=1 to m). The input pattern X 18 is then expressed as $X=(X_1, X_2, \ldots, X_m)$, where each element $X_i$ is an index of a certain type calculated from the stock index, namely, from the time series data of stock index so as to be used by the user to objectively judge the trend of activities in the stock market. Representative indices are, for example, a moving average and a ratio of deviation from moving average.

For example, a moving average ma of d past days is calculated as $$ma = 1/d(a_N + a_{N-1} + \ldots + a_{N-d+1}).$$

Actually, the number d of days is usually set to 5, 20, 60, and 120 respectively for short-term, intermediate-term, and long-term predictions.

In addition, a ratio of deviation from moving average k is attained as $$K = (a_N - ma)/ma.$$

Moreover, various kinds of indices can be calculated according to the time series data of stock index.

Next, the neural network 11 of the pattern classifying apparatus receives as an input thereto the input pattern X 18 of which each element Xi is an index of the stock index and then produces an output pattern 19 to thereby classify the pattern 19 into either one of, for example, three categories as follows.

(1) Category related to a state in which the stock index indicates a turning point from increase to decrease thereof. This point is denoted as a peak in the graph and is considered to be an important signal to sell stocks.

(2) Category related to a state in which the stock index indicates a turning point from decrease to increase thereof. This point is denoted as a branching point (valley) in the graph and is considered to be an important signal to purchase stocks.

(3) Other categories.

Assume that the three categories are represented as output patterns Y 19, for example, in the following forms.

(1) ... (1,0,0)
(2) ... (0,1,0)
(3) ... (0,0,1)

To achieve the training of the neural network 11 so that the network 11 produces the output pattern Y 19 as a classification result in response to an input pattern X 18 as above, it is necessary to prepare a correct output pattern T corresponding to the input pattern X 18. For example, the pattern T 111 can be produced with three data items $a_{N-5}$ 1101, $a_N$ 1102, and $a_{N+5}$ selected from the time series data ai as follows.

(1) For $a_{N-5} < a_N$ and $a_N > a_{N+5}$, T=(1,0,0)
(2) For $a_{N-5} > a_N$ and $a_N < a_{N+5}$, T=(0,1,0)
(3) For other cases, T=(0,0,1)

where, $a_N$ is data at the current point (the latest data), $a_{N-5}$ is data collected five days before the day associated with the current point, and $a_{N+5}$ is data to be developed five days thereafter. As a consequence, the correct output pattern T 111 for the present input pattern X 18 is calculated only when five days are elapsed after the data $a_{N+5}$ is attained. At the current point, based on the data $a_{N-10}$, $a_{N-5}$, and $a_N$, there can be calculated only the correct output pattern T 111 for the input pattern attained five days before.

As above, the pattern generator 1003 generates the input pattern X 18 of the current point and the correct output pattern T 111 for the input pattern X gathered five days before, thereby outputting the resultant patterns to the pattern input device 23 of the pattern classifying apparatus.

Figure 1:
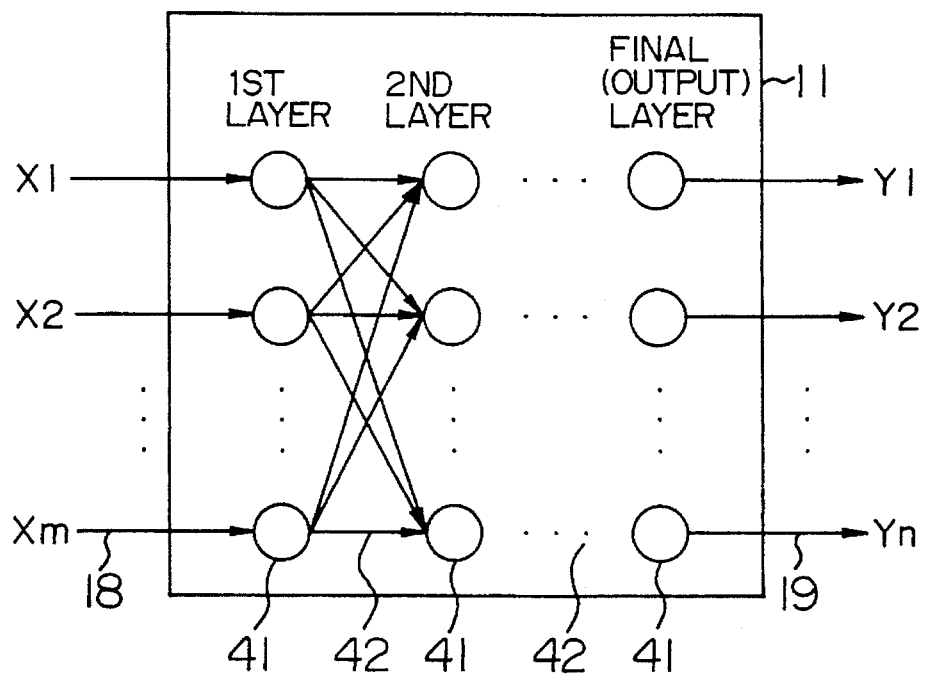
FIG. 1 is a diagram schematically showing the overall configuration of a neural network.

Based on the input pattern X 18 and the correct output pattern T 111 thus received, the pattern classifying apparatus of FIG. 1 accomplishes a pattern classification as described above and then conducts necessary operations, for example, to display the position of the input pattern in the distribution, to notify the necessity of re-training.

The present invention is not restricted by the system for predicting the stock index trend, namely, the present invention is also applicable to various systems such as an image recognition system, a failure diagnosis system.

As described above, according to the present invention, an input pattern is compared with training data to determine whether or not the input pattern is away from the distribution of the input patterns of training data. Consequently, the user can judge the reliability of the output pattern created from the neural network. Moreover, the history of execution is monitored to detect a decrease in the ratio of correct output so as to notify the necessity of re-training of the neural network to the user. In consequence, the user can accordingly execute the re-training of the neural network to increase the reliability.

While particular embodiments of the invention have been shown and described, it will be obvious to those skilled in the art that various changes and modifications may be made without departing from the present invention in its broader aspects.

I claim:

1. A pattern classification method using a neural network, the method comprising steps of:

I) training the neural network including:
      a) applying known training data to the neural network, the known training data each including a training input pattern which is applied to the neural network to produce a network output pattern and a corresponding reference output pattern;
      b) adjusting the neural network until the network output pattern matches the reference output pattern;
      c) repeating steps (a)–(b) for a plurality of training data to train the neural network;

II) classifying input patterns with the trained neural network including:
      d) applying an input pattern to be classified to the trained neural network;
      e) obtaining a corresponding network output pattern corresponding to the input pattern;
      f) storing the input pattern and the corresponding network output pattern in a memory;

III) determining a trained neural network abnormality including:
      g) comparing the stored network output pattern with a correct output pattern when the correct output pattern is subsequently obtained to determine a deviation therebetween;
      h) repeating steps (d)–(g) for a plurality of input patterns to determine a plurality of the deviations;
      i) storing a cumulative deviation in the memory; and
      j) monitoring the cumulative deviation to detect a cumulative abnormality of the trained neural network.

2. A pattern classification method using a neural network, the method comprising steps of:

I) training the neural network with training data that includes a plurality of pairs of preselected corresponding training input and output patterns, the training including:
      a) applying one of the training input patterns to the neural network;
      b) adjusting the neural network such that the applied training input pattern produces the corresponding training output pattern;
      c) repeating steps (a)–(b) for each of training data, whereby the neural network is trained;

II) classifying input patterns including:
      d) applying an input pattern to be classified to the trained neural network and obtaining a corresponding projected output pattern;

III) determining whether to retrain the neural network including:
      e) comparing the projected output pattern with a correct output pattern corresponding to the input pattern to determine a deviation therebetween;
      f) repeating steps (c)–(e) for a plurality of input patterns to be classified;
      g) combining the deviations to determine a cumulative deviation;
      h) in response to the cumulative deviation exceeding a preselected deviation level, notifying an operation to re-train the neural network.

3. A method according to claim 2, wherein the notifying step includes:

generating a human readable notice that the neural network is due for retraining on a display.

4. A method according to claim 2, wherein:

in the comparing step the deviation is an error between the projected output pattern and the correct output pattern; and the combining step comprises:

averaging the errors to obtain an average error; and the comparing step includes determining whether the average error exceeds a predetermined threshold value.

5. A method according to claim 2, further comprising the step of:

generating new training data in response to the detection of the cumulative deviation exceeding the preselected level and storing the new training data.

6. A method according to claim 5, wherein the step of generating new training data generates the new training data based on previous training data used in a previous training and a previous input pattern and a previous correct output pattern obtained after the previous training.

7. A method according to claim 2, further comprising the step of re-training the neural network in response to the notifying.

8. A pattern classification apparatus using a neural network, the apparatus comprising:

means for applying each of a plurality of preselected training input patterns to the neural network, each of the preselected training input patterns having a corresponding reference output pattern;

a neural network training means for adjusting the neural network such that each preselected training input pattern produces the corresponding reference output pattern;

means for applying an input pattern to be classified to the neural network each input pattern producing a neural output pattern;

means for retrieving from a data file, a correct output pattern corresponding to each of the input patterns to be classified;

means for comparing each neural output pattern with the corresponding correct output pattern to determine a deviation therebetween;

memory means for accumulating and storing the deviations; and means for monitoring the stored deviations to detect an abnormality condition.

9. A pattern classification apparatus using a neural network, the pattern classification apparatus comprising:

means for applying each of a plurality of known training input patterns to the neural network;

means for adjusting the neural network until the neural network produces a preselected reference output pattern corresponding to each training input pattern;

a classifying means for applying an input pattern to be classified to the neural network and obtaining a projected output pattern corresponding to the input pattern;

an abnormality condition determining means including:

means for subsequently retrieving a second output pattern from a data file, the second output pattern representing a correct output pattern corresponding to the input pattern applied for classification;

means for comparing the projected output pattern with the second output pattern corresponding to each input pattern applied for classification to determine a deviation therebetween;

memory for cumulatively storing the deviation;

means for monitoring the stored cumulative deviation to detect the abnormality condition; and means for notifying to re-train the neural network in response to a detection of the abnormality condition.

10. An apparatus according to claim 9, wherein the notifying means includes a means for generating a human-readable display.

11. A apparatus according to claim 9, wherein the deviation represents an error between the projected output pattern and the second output pattern and the abnormality detecting means further comprises:

means for averaging the deviations to generate an average deviation representing an average of errors attained for a plurality of the input patterns applied for classification; and means for determining whether the average deviation exceeds a predetermined threshold value.

12. An apparatus according to claim 9, further comprising:

means for generating new training data in response to the detection of the abnormality condition; and a means for storing the new training data.

13. An apparatus according to claim 12, wherein the means of generating new training data includes:

means for generating the new training data based on previous training data used in a previous training and a previous input pattern and a previous correct output pattern obtained after the previous training.

14. An apparatus according to claim 9, further comprising:

means for re-training of the neural network in response to the means for notifying.

* * * * *